United States Patent [19]

Matsuda et al.

[11] 4,363,985
[45] Dec. 14, 1982

[54] POLE CHANGE DYNAMO-ELECTRIC MACHINES

[75] Inventors: Satoshi Matsuda; Etsuo Kiyohara, both of Mie, Japan

[73] Assignee: Tokyo Shibaura Denki Kabushiki Kaisha, Kanagawa, Japan

[21] Appl. No.: 233,315

[22] Filed: Feb. 11, 1981

[30] Foreign Application Priority Data

Feb. 20, 1980 [JP] Japan .................................. 55-19215

[51] Int. Cl.³ .................................................. H02K 3/00
[52] U.S. Cl. .................................. 310/184; 310/206; 310/207; 318/773
[58] Field of Search ................. 310/179, 180, 184, 71, 310/198–208; 318/773

[56] References Cited

U.S. PATENT DOCUMENTS

| | | | |
|---|---|---|---|
| 2,217,460 | 10/1940 | Trassl | 310/202 |
| 3,070,734 | 12/1962 | Rawcliffe | 318/773 R |
| 3,175,143 | 3/1965 | Rawcliffe | 318/773 R |
| 3,197,686 | 7/1965 | Rawcliffe | 318/773 R |
| 3,308,363 | 3/1967 | Rawcliffe | 318/773 R |
| 4,144,470 | 3/1979 | Auinger | 310/198 |

FOREIGN PATENT DOCUMENTS 53-25810 3/1978 Japan .................................. 310/198

*Primary Examiner*—R. Skudy
*Attorney, Agent, or Firm*—Stevens, Davis, Miller & Mosher

[57] ABSTRACT

A pole change dynamo-electric machine with three-phase distributed winding is adapted for reconnection to form either one of two different pole numbers and for operation on either one of two different voltages. The adjacent coils of the winding are divided into N coil groups, N being equal to three times the greater one of the pole numbers. Every twelve adjacent coil groups form a set of coil groups. The beginning and end terminals of the specific coil groups within each set are connected and the rest of the terminals are reconnectable.

4 Claims, 7 Drawing Figures

POLE CHANGE DYNAMO-ELECTRIC MACHINES

BACKGROUND OF THE INVENTION

The present invention relates to a pole change dynamo-electric machine with a three-phase stator winding adapted for reconnection to form either one of two pole numbers having a ratio of 1:2 and adapted for reconnection for operation on either one of two voltages having a ratio of about 1:2.

Pole change dynamo-electric machines, such as three-phase induction motors, adapted to have either one of two pole numbers having a ratio of 1:2, e.g., either two poles or four poles, have been known which are operable on a single voltage. Where it is required that such a pole change dynamo-electric machine is operable on either one of two different voltages having a ratio of, for instance, about 1:2, pole change dynamo-electric machines with separate windings for different pole numbers have been used. Pole change dynamo-electric machines with separate windings have a large stator core and are hence bulky, and require a large amount of copper and making them costly. Moreover, voltages are induced in the winding which are not used, and circulating currents may flow through the winding, depending on the manner of connection of the winding, and may cause burning of the winding.

SUMMARY OF THE INVENTION

An object of the invention is to provide a pole change dynamo-electric machine with a single distributed three-phase stator winding adapted for reconnection to form either one of two pole numbers having a ratio of 1:2 and adapted for reconnection for operation on either one of two voltages having a ratio of about 1:2.

Another object of the invention is to provide a pole change dynamo-electric machine which can be formed by using a stator core, with a single winding, of a standard motor which is mass-produced, and is hence economical and has standardized characteristics.

A further object of the invention is to provide a pole change dynamo-electric machine wherein all the poles formed are real poles rather than image poles, and the winding factor and the performance of the rotating machine are improved.

According to the invention, there is provided a pole-change dynamo-electric machine having a stator core provided with slots receiving coils of a three-phase distributed winding adapted for reconnection to form either one of two pole numbers having a ratio of 1:2 and for reconnection for operation on either one of two voltages having a ratio of about 1:2, characterized in that the coils of the winding are divided into coil groups of a number equal to three times the greater one of the pole numbers, each of the coil groups consisting of a coil or coils arranged in adjacent positions and having a beginning terminal and an end terminal, every twelve adjacent coil groups forming a set of coil groups, and the coil groups of each set being consecutively numbered in the order of their positions, and the beginning terminal of the second coil group and the end terminal of the eleventh coil group are connected together, the end terminal of the seventh coil group and the beginning terminal of the tenth coil group are connected together, and the beginning terminal of the ninth coil group and the end terminal of the twelfth coil group are connected together.

DETAILED DESCRIPTION OF THE PREFERRED EMBODIMENT

Figure 1:
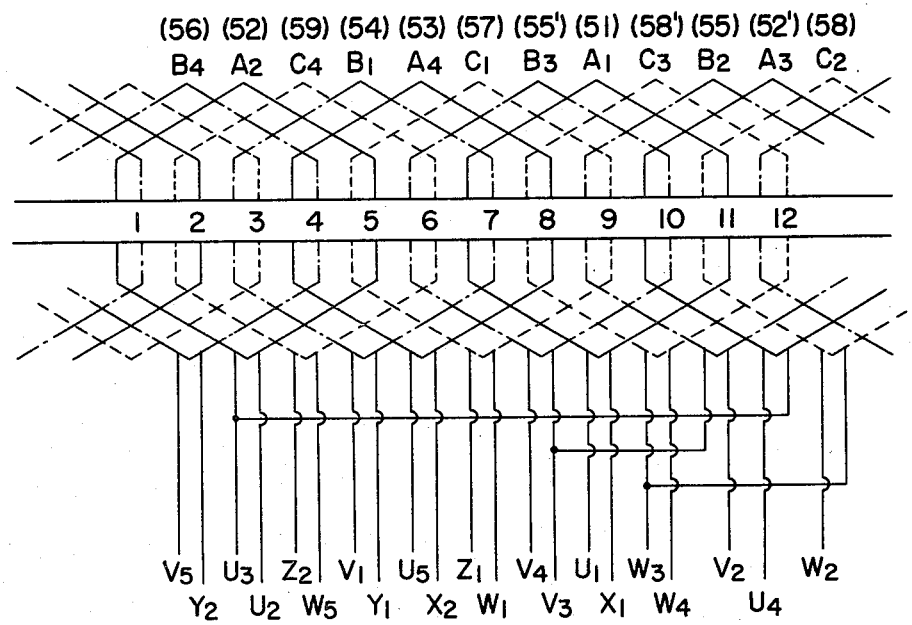
FIG. 1 is a developed diagram showing a stator winding of an embodiment of a pole change dynamo-electric machine according to the invention.
Figure 2:
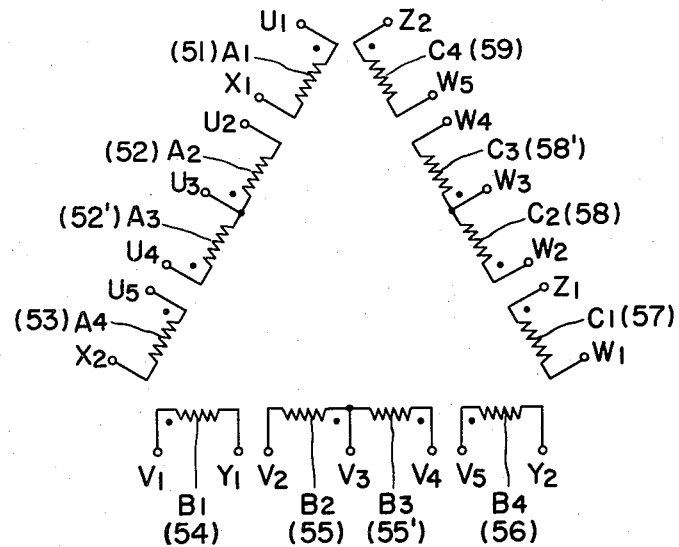
FIG. 2 is a connection diagram of the stator winding shown in FIG. 1.

Referring now more particularly to FIGS. 1 through 7, there is shown an embodiment of a pole change dynamo-electric machine according to the invention. The dynamo-electric machine of this embodiment is a three-phase squirrel-cage motor having a stator with three-phase lap winding, wherein the coils are arranged in twelve slots. FIG. 2 shows the connections of the coils. The connections of the terminals of the coils at various modes of operation are shown in Table 1.

TABLE 1

| SPEED | VOLTAGE | GENERAL CONNECTION | CONNECTION TO POWER SUPPLY | CONNECTION TO EACH OTHER |
|---|---|---|---|---|
| HIGH | HIGH | 1 × Δ | R—$W_3$<br>S—$U_3$<br>T—$V_3$ | $W_4$—$W_5$ $W_1$—$Y_2$ $W_2$—$Z_1$<br>$U_4$—$U_5$ $U_1$—$Z_2$ $U_2$—$X_1$<br>$V_4$—$V_5$ $V_1$—$X_2$ $V_2$—$Y_1$ |
| | LOW | 2 × Δ | R—$W_3$—$W_5$—$Z_1$<br>S—$U_3$—$U_5$—$X_1$<br>T—$V_3$—$V_5$—$Y_1$ | $W_4$—$U_1$—$U_2$—$Z_2$<br>$U_4$—$V_1$—$V_2$—$X_2$<br>$V_4$—$W_1$—$W_2$—$Y_2$ |
| LOW | HIGH | 2 × Y | R—$U_2$—$U_4$<br>S—$V_2$—$V_4$<br>T—$W_3$ | $U_3$—$U_5$—$X_1$   $U_1$—$X_2$<br>$V_3$—$V_5$—$Y_1$   $V_1$—$Y_2$<br>$W_1$—$W_2$—$W_4$—$Z_2$ $W_5$—$Z_1$ |
| | LOW | 4 × Y | R—$U_2$—$U_4$—$U_5$—$X_1$<br>S—$V_2$—$V_4$—$V_5$—$Y_1$<br>T—$W_1$—$W_3$—$Z_2$ | $U_1$—$U_3$—$X_2$<br>$V_1$—$V_3$—$Y_2$<br>$W_2$—$W_4$—$W_5$—$Z_1$ |

Figure 3:
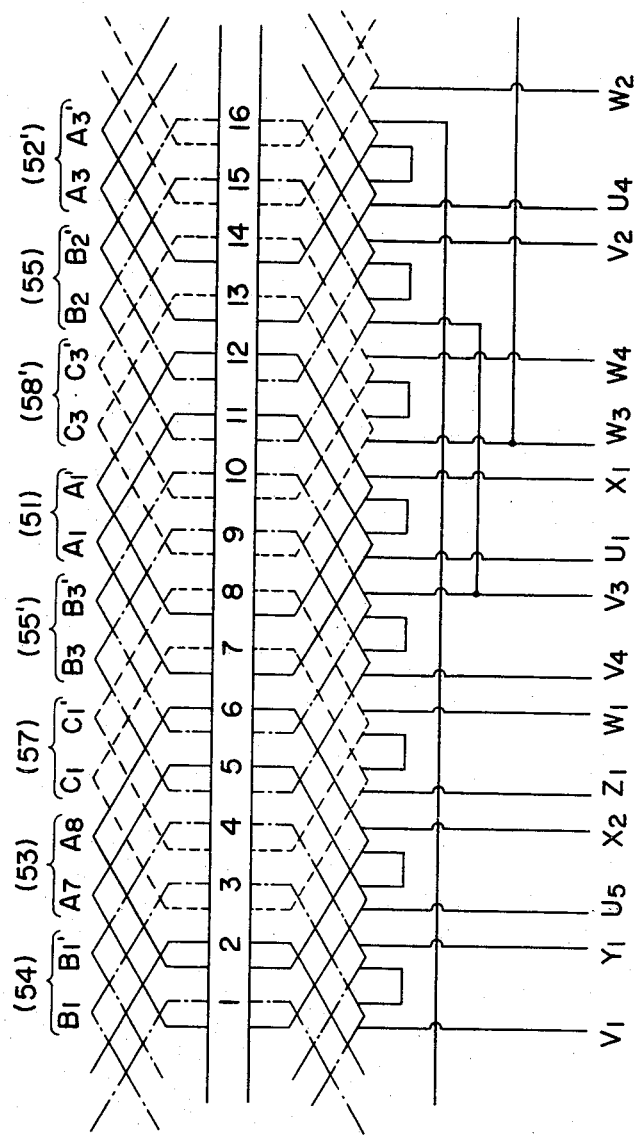
FIG. 3 is a developed diagram showing a stator winding of a modification of the invention.

In FIG. 1, denoted by numerals 1–12, are slots, in which coils $A_1$–$A_4$, $B_1$–$B_4$ and $C_1$–$C_4$ are received. The coils have terminals respectively denoted by $U_1$–$U_5$, $V_1$–$V_5$, $W_1$–$W_5$, $X_1$, $X_2$, $Y_1$, $Y_2$, $Z_1$ and $Z_2$. As mentioned above, the stator is shown to have twelve slots, but the number of slots may alternatively be 24, 36, 48, or the like. In such cases, coils received in adjacent slots are connected together to conduct the current of the same phase. For generalization, the coil $A_1$ will be called coil group 51, and similarly the coils $A_2$–$A_4$, $B_1$–$B_4$ and $C_1$–$C_4$ are called 52, 52', 53, 54, 55, 55', 56, 57, 58, 58' and 59, and these are arranged in the order of first to twelfth coil groups 56, 52, 59, 54, 53, 57, 55', 51, 58', 55, 52' and 58, from the left as viewed in FIG. 1. The beginning terminal of the second coil group 52 and the end terminal of the eleventh coil group 52' are connected together to form a terminal $U_3$. The end terminal of the seventh coil group 55' and the beginning terminal of the tenth coil group 55 are connected together to form a terminal $V_3$. The beginning terminal of the ninth coil group 58' and the end terminal of the twelfth coil group 58 are connected together to form a terminal $W_3$.

Where there are 24 coils and each coil group consists of two coils, the two coils of each group may be connected in series with each other as shown in FIG. 3. For instance, the coils $A_1$ and $A_1'$ of a group 51 are series-connected, and the coils $C_3$ and $C_3'$ of a group 58' are series-connected.

As shown in Table 1, the terminals are adapted for reconnection for different modes of winding connection, and hence for difference modes of motor operation.

For instance, for four-pole (low speed) high voltage operation, $2 \times Y$ winding connection is adopted. For this to be achieved, the terminals $U_2$ and $U_4$ are both connected to a first power supply line R, the terminals $V_2$ and $V_4$ are both connected to a second power supply line S, and the terminal $W_3$ is connected to a third power supply line T. The terminals $U_3$, $U_5$ and $X_1$ are connected together, the terminals $V_3$, $V_5$ and $Y_1$ are connected together, the terminals $U_1$, $X_2$, $V_1$, $Y_2$, $W_5$ and $Z_1$ are connected together, and the terminals $W_1$, $W_2$, $W_4$ and $Z_2$ are connected together. The resultant winding connection is as shown in FIG. 4.

For four-pole (low speed) low voltage operation, $4 \times Y$ winding connection is adopted. Then, the terminals $U_2$, $U_4$, $U_5$ and $X_1$ are all connected to the first power supply line R, the terminals $V_2$, $V_4$, $V_5$ and $Y_1$ are all connected to the second power supply line S, and the terminals $W_1$, $W_3$ and $Z_2$ are all connected to the third power supply line T. The terminals $U_1$, $U_3$, $X_2$, $V_1$, $V_3$, $Y_2$, $W_2$, $W_4$, $W_5$ and $Z_1$ are all connected together. The resultant winding connection is as illustrated in FIG. 5.

Figure 4:
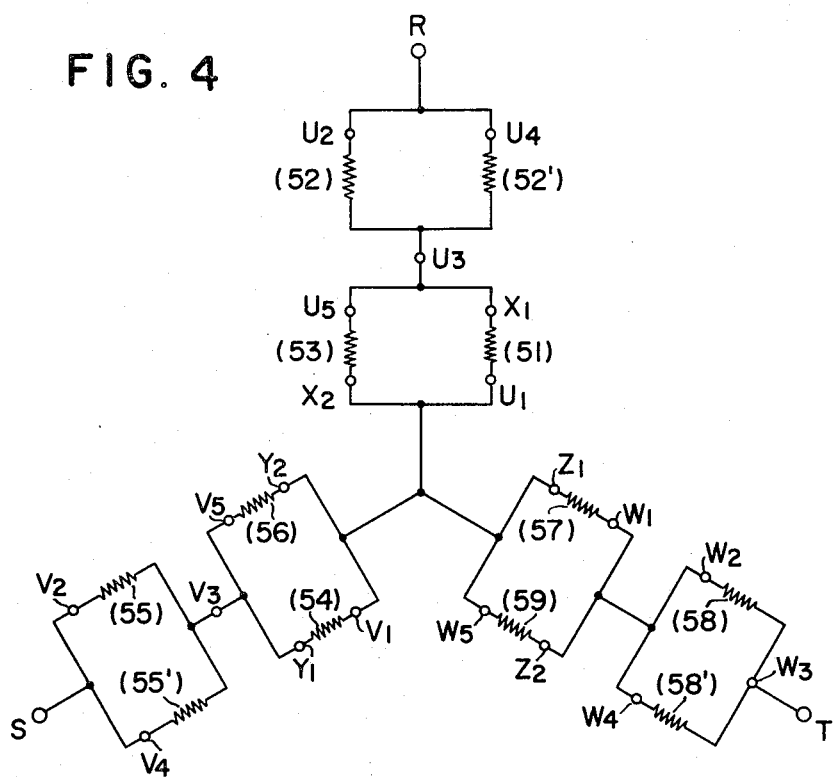
FIGS. 4–7 are connection diagrams showing how the coils are connected for different modes of operation.
Figure 5:
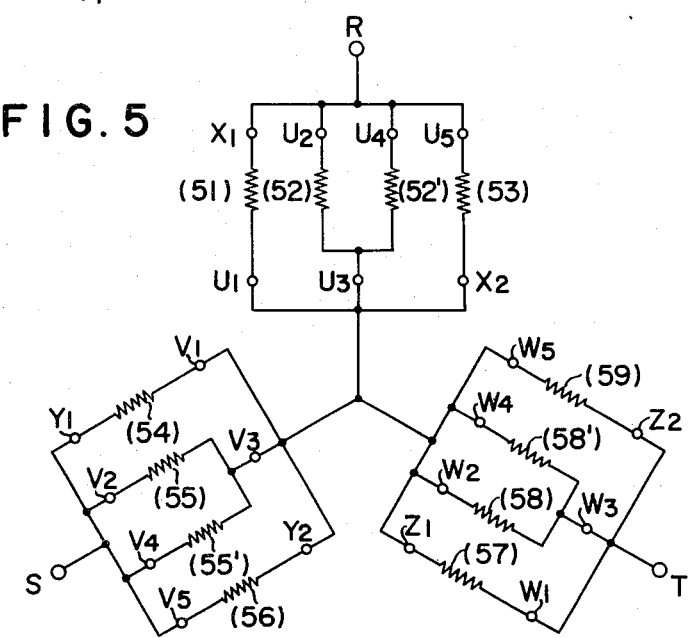

In either of FIGS. 4 and 5, the coil groups 51, 52, 52' and 53 form a U-phase winding, the coil groups 54, 55, 55' and 56 form a V-phase winding and the coil groups 57, 58, 58' and 59 form a W-phase winding. Thus, the winding arrangement is capable of adoption to either of $2 \times Y$ winding connection and $4 \times Y$ winding connection.

For two-pole (high speed) high voltage operation, $1 \times \Delta$ winding connection is adopted. Then, the terminals $W_3$, $U_3$ and $V_3$ are respectively connected to the power supply lines R, S and T. The terminals $W_4$ and $W_5$, the terminals $W_1$ and $Y_2$, the terminals $W_2$ and $Z_1$, the terminals $U_4$ and $U_5$, the terminals $U_1$ and $Z_2$, the terminals $U_2$ and $X_1$, the terminals $V_4$ and $V_5$, the terminals $V_1$ and $X_2$, and the terminals $V_2$ and $Y_1$ are respectively connected together. The resultant winding connection is as illustrated in FIG. 6.

For two-pole (high speed) low voltage operation, $2 \times \Delta$ winding connection is adopted. Then, the terminals $W_3$, $W_5$ and $Z_1$ are all connected to the first power supply line R, the terminals $U_3$, $U_5$ and $X_1$ are all connected to the second power supply line S, and the terminals $V_3$, $V_5$ and $Y_1$ are all connected to the third power supply line T. The terminals $W_4$, $U_1$, $U_2$ and $Z_2$, the terminals $U_4$, $V_1$, $V_2$, and $X_2$, and the terminals $V_4$ $W_1$, $W_2$ and $Y_2$ are respectively connected together. The resultant winding connection is as illustrated in FIG. 7.

Figure 6:
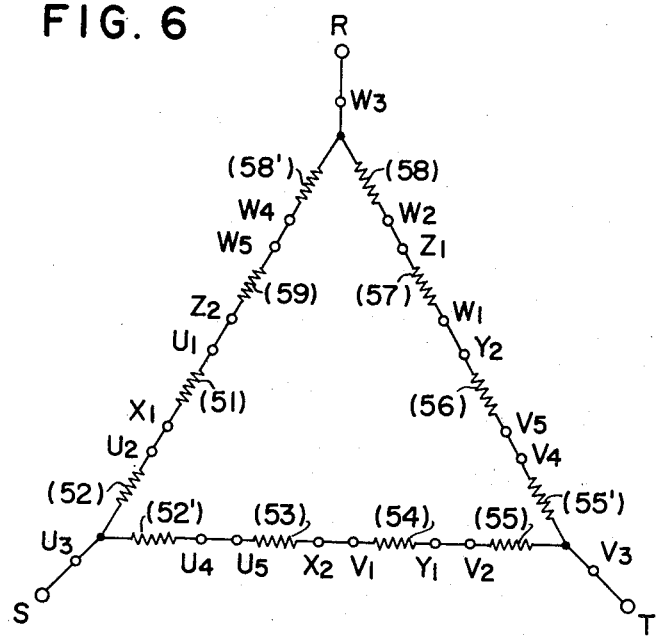
Figure 7:
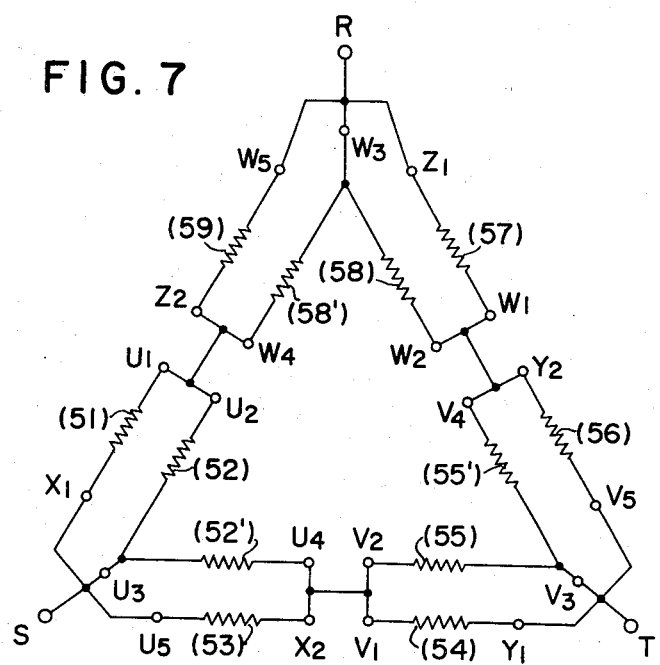

In either of FIGS. 6 and 7, the coil groups 51, 52, 58' and 59 form a U-phase winding, the coil groups 52', 53, 54 and 55 form a V-phase winding, and the coil groups 55', 56, 57 and 58 form a W-phase winding. Thus, the winding arrangement is capable of adoption to either of $1 \times \Delta$ winding connection and $2 \times \Delta$ winding connection.

Comparison of the winding connections between four-pole operation (FIGS. 4 and 5) and two-pole operation (FIGS. 6 and 7) will show that the phases and the polarities of the coil groups 52, 55 and 57 are unchanged, the phases of the coil groups 53, 56 and 58' are changed while their polarities are unchanged, the polarities of the coil groups 51, 54 and 58 are changed while their phases are unchanged, and the phases and the polarities of the coil groups 52', 55' and 59 are both changed.

It will be appreciated that the pole change and voltage change are both possible, and the poles formed are real poles rather than image poles even when the winding is connected to result in four poles. Therefore, the winding factor and the performance of the motor are improved.

The invention has been described with reference to a particular embodiment of the invention, but the invention is applicable to other situations:

(1) Where Y winding connection is used for the smaller number of poles and $\Delta$ winding connection is used for the larger number of poles. This arrangement is used to enable speed-change with constant-torque.

(2) Where the winding pitch is different from that of the embodiment described above.

(3) Where wave winding or concentric winding is used, in place of the lap winding.

(4) Where the pole numbers are other than 2 and 4.

For instance, where 4/8 pole-change dynamo-electric machine is desired, the coils are divided into 24 coil groups, every twelve coil groups form a set of coil groups. The coil groups of each set of coil groups are connected in the same manner as explained in connection with the embodiment described.

It will now be appreciated that the invention provides a pole change dynamo-electric machine having a single stator winding adapted for reconnection to form either one of two pole numbers having a ratio of 1:2 and for reconnection for operation on either one of two voltages having a ratio of about 1:2. The stator core of a mass-produced standard motor can be used without modification and even when the winding is connected to result in the larger number of poles all the poles formed are real poles rather than image poles. Accordingly, the winding factor and the performance of the dynamo-electric machine are improved. Moreover, reduction in size and standardization of the rotating machine are facilitated.

What is claimed is:

1. In a pole change dynamo-electric machine having a stator core provided with slots receiving coils of three-phase distributed winding adapted for reconnection to form either one of two pole numbers having a ratio of 1:2 and for reconnection for operation on either one of two voltages having a ratio of about 1:2, the improvement wherein said coils of said winding are divided into coil groups of a number equal to three times the greater one of said pole numbers, each of said coil groups consisting of a coil or coils arranged in adjacent positions and having a beginning terminal and an end terminal, every twelve adjacent coil groups forming a set of coil groups, and the coil groups of each set being consecutively numbered in the order of their positions, and the beginning terminal of the second coil group and the end terminal of the eleventh coil group are connected together, the end terminal of the seventh coil group and the beginning terminal of the tenth coil group are connected together, and the beginning terminal of the ninth coil group and the end terminal of the twelfth coil group are connected together.

2. A pole change dynamo-electric machine according to claim 1, wherein said winding is adapted for reconnection to form either two poles or four poles.

3. A pole change dynamo-electric machine according to claim 2, wherein the beginning terminals and the end terminals of said coil groups are reconnected to form a $1 \times \Delta$ winding connection for two-pole high voltage operation, $2 \times \Delta$ winding connection for two-pole low voltage operation, $2 \times Y$ winding connection for four-pole high voltage operation, and $4 \times Y$ winding connection for four-pole low voltage operation.

4. A pole change dynamo-electric machine according to claim 1, wherein, in changing the number of poles, the phases and the polarities of the second, the sixth and the tenth coil groups are unchanged, the phases of the first, the fifth and the ninth coil groups are changed while their polarities are unchanged, the polarities of the fourth, the eighth and the twelfth coil groups are changed while their phases are unchanged, and the polarities and the phases of the third, the seventh and the eleventh coil groups are both changed.

* * * * *